July 21, 1931.   J. SCHICK   1,815,592
METHOD OF MAKING BLADES
Filed March 17, 1927
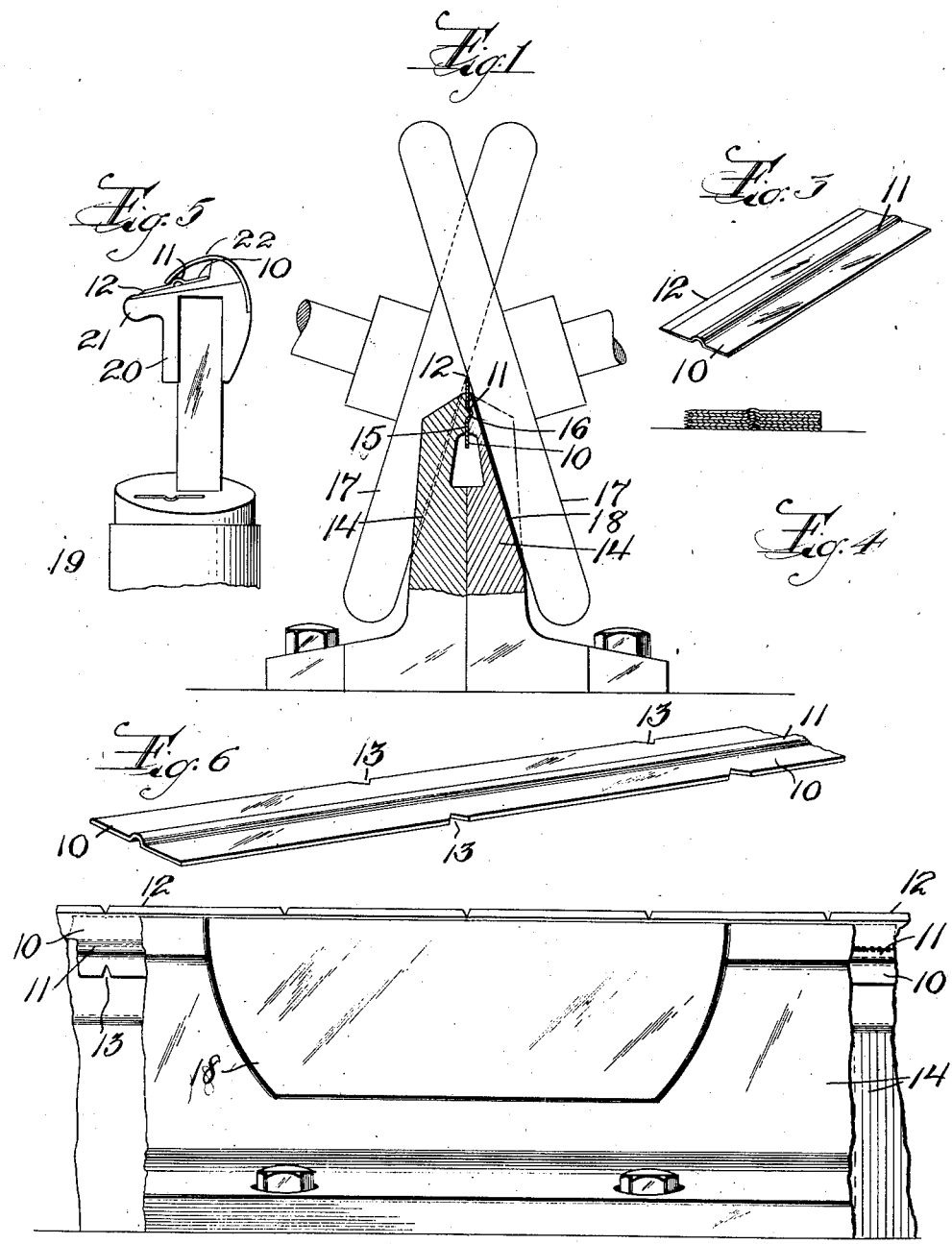

Patented July 21, 1931

1,815,592

UNITED STATES PATENT OFFICE

JACOB SCHICK, OF STAMFORD, CONNECTICUT, ASSIGNOR TO MAGAZINE REPEATING RAZOR COMPANY, A CORPORATION OF NEW JERSEY

METHOD OF MAKING BLADES

Application filed March 17, 1927. Serial No. 176,001.

This invention relates to an improved blade for safety razors and the like, the blade having an integral part thereof formed so as to form a guide for the location of the edge relative to the point of guiding in a guiding machine and relative to the position the blade occupies in a razor.

The invention also relates to a method of making the blade by utilizing an integral projecting part as a guide for conducting the blade along a track or similar device of stable construction so that the blade passes along a fixed path of travel and is thus conducted across a suitable edge-treating device such as a grinder or rotating hone which is fixed in its place.

The invention will be more fully understood from an inspection of the accompanying drawings in which Figure 1 is a section showing a blade in position in a track and with grinding wheels in position to treat the edge. Figure 2 is a side view of Figure 1 with the wheels omitted. Figure 3 is a perspective view of a blade made according to my invention. Figure 4 is a section showing how the blades are subject to stacking. Figure 5 is a view of part of a razor with one of my new forms of blade in place therein. Figure 6 is a perspective view of blades in a strip to be broken off after grinding.

The blade is provided with a projecting bead or a series of aligned projection spaced apart longitudinally on the blade and in the drawings I show a blade 10 provided with a bead 11 in rear of its cutting edge 12. The bead is formed when the strip of steel is made in the steel mill and is usually made by rolls and is substantially straight and while it can be placed at any point on the blade in rear of cutting edge it is usually placed about in the centre as shown in the drawings. This blade allows of close nesting as shown in Figure 4 and the blades can not slide except longitudinally.

The blade is made by a method which insures the cutting edge being the same distance from the blade for its entire length without regard to any unevenness of the back edge or of the front edge before it is ground. This method includes the longitudinal sliding of a blade along a fixed path of travel and usually in the form of a strip shown in Figure 6, with indentations 13 or other weakened parts to indicate points of breakage although breaking can be accomplished without the parts 13. They are advisable, however, as the blades so made are cut back at the corner which is advisable in safety razor blades.

These blades or a strip of blades are fed through a rigid track one form of track being shown at 14 with a passage 15 for the blades and having a part 16 offset to receive the projecting part of the blade. Any suitable edge-treating devices such as the grinding wheels 17 are fixed in position and therefore grind in the same plane. As they are fixed and the track is fixed the cutting edge 12 is always at a fixed line or point relative to the bead 11. The wheels 17 are, of course, kept in position and adjusted so as to take up wear by suitable adjusting means. Such means are common and can be of the type used in an application made jointly by Dorlias Nadeau and myself on grinding machines, filed May 19, 1926, Serial No. 110,045. The track is cut away on alternate sides as at 18 to allow the wheels 17 to be brought up close to the blade at the proper angle.

When these blades are used in a razor they can be positioned relative to any guard or fender by means of the bead 11. I show a razor such as embraced in my application for patent filed May 16, 1925, Serial No. 30,681. Of course this razor is merely for clear illustration as other forms are possible for receiving this blade. I show part of the razor including the handle 19 and the shaving head 20 with its guard 21 and the blade clamping strip 22 which is positioned so that the bead 11 acts to hold the blade from any forward movement from its proper place as defined by the plate 22.

The results of this form of blade are that the cutting edge of all blades is the same relative to the bead 11 on each one, the blades are therefore uniform and they are all used in exactly the same position in the razor by reason of this bead.

Furthermore, these blades when used in razors of the magazine type which used stacks of blades as a supply, the bottom blade of the stack can rest on ridge over which the bead is placed and the other blades in the stack are free to move longitudinally in succession but are held in alignment and do not slip or move to the front or rear as will be seen from Figure 4.

I claim:

1. The method of making blades which consists in providing a flat blade with a projection thereon and sharpening the blade while passing it along a fixed path of travel defined by the projection.

2. The method of making blades which consists in providing a flat blade with a projection thereon and sharpening the blade while guiding it by means of said projection.

3. The method of making blades which consists in providing a strip of metal with a longitudinal rib, passing the strip along a fixed path of travel defined by the rib, and treating one edge of the strip so passing so that the finished edge is the same distance from the rib for its entire length.

In testimony whereof I affix my signature.

JACOB SCHICK.